(12) United States Patent
Poli et al.

(10) Patent No.: US 11,949,718 B2
(45) Date of Patent: Apr. 2, 2024

(54) ESTABLISHING A TRUSTED PATH AND TRANSMITTING INFORMATION VIA A NETWORK OF UNTRUSTED ELEMENTS

(71) Applicant: ARRIS Enterprises LLC, Suwanee, GA (US)

(72) Inventors: Christopher Poli, Doylestown, PA (US); Roger D Gahman, Telford, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 294 days.

(21) Appl. No.: 17/551,102

(22) Filed: Dec. 14, 2021

(65) Prior Publication Data
US 2022/0232041 A1   Jul. 21, 2022

Related U.S. Application Data

(60) Provisional application No. 63/138,002, filed on Jan. 15, 2021.

(51) Int. Cl.
*H04L 9/40* (2022.01)
*H04L 9/32* (2006.01)
*H04L 45/02* (2022.01)

(52) U.S. Cl.
CPC ............ *H04L 63/20* (2013.01); *H04L 9/3268* (2013.01); *H04L 45/02* (2013.01); *H04L 63/0823* (2013.01)

(58) Field of Classification Search
CPC ... H04L 63/20; H04L 63/0823; H04L 9/3268; H04L 45/02; H04W 12/102; H04W 12/66
See application file for complete search history.

(56) References Cited

U.S. PATENT DOCUMENTS

| | | | |
|---|---|---|---|
| 2007/0180495 A1* | 8/2007 | Hardjono | H04W 12/069 726/3 |
| 2008/0022389 A1* | 1/2008 | Calcev | H04W 40/28 726/14 |
| 2013/0239169 A1* | 9/2013 | Nakhjiri | H04L 63/123 726/1 |
| 2015/0033024 A1* | 1/2015 | Mashima | H04L 63/123 713/176 |
| 2017/0353430 A1* | 12/2017 | Holtmanns | H04L 63/12 |
| 2021/0314260 A1* | 10/2021 | Hayes | H04L 45/02 |

OTHER PUBLICATIONS

Jensen, C.D., Connell, P.O. (2006). Trust-Based Route Selection in Dynamic Source Routing. In: Stølen, K., Winsborough, W.H., Martinelli, F., Massacci, F. (eds) Trust Management. iTrust 2006. Lecture Notes in Computer Science, vol. 3986. Springer, Berlin, Heidelberg. https://doi.org/10.1007/11755593_12 (Year: 2006).*

Rose, S., et al., "Zero Trust Architecture", NIST Special Publication 800-207, National Institute of Standards and Technology, U.S. Department of Commerce, Aug. 2020, pp. 1-59.

* cited by examiner

*Primary Examiner* — Robert B Leung
(74) *Attorney, Agent, or Firm* — Chernoff, Vilhauer, McClung & Stenzel, LLP

(57) ABSTRACT

An overlay to existing infrastructure that establishes trusted paths in a communication network to fulfill a fundamental need to identify and protect a trusted plane of devices and/or applications on a need specific basis is described. Establishing trusted paths operationally fulfills a fundamental need to identify and protect a trusted plane of devices and/or applications on a need specific basis as an overlay to the existing relatively unsecured network.

37 Claims, 7 Drawing Sheets

ESTABLISHING A TRUSTED PATH AND TRANSMITTING INFORMATION VIA A NETWORK OF UNTRUSTED ELEMENTS

BACKGROUND OF THE INVENTION

1. Field of the Invention

The present invention relates to systems and methods for transmitting data, and in particular to a system and method for establishing and transmitting data on a trusted network.

2. Description of the Related Art

In many applications, it is desirable to provide information from an information source to an information sink. Such transfer of information is typically accomplished in a network having a plurality of nodes, with information being transferred from node to node until the information arrives at the final destination or information sink. One of the difficulties in such transmission of data, particularly when accomplished in a multi-node environment, is to assure the security of the transmitted information. While sensitive data is typically encrypted before such transmission and decrypted upon receipt, no such encryption is completely secure, and it is desirable to assure that the information does not pass through nodes of less than desirable security. In a particular application, it is envisioned that fifth generation (5G) data transmission will require a level of network security in which trusted data transmission paths are utilized.

What is needed is a system and method that allows operators to establish and trusted network nodes and to mandate that security sensitive information be transmitted over segments between such trusted nodes. The present invention satisfies that need.

SUMMARY OF THE INVENTION

To address the requirements described above, the present invention discloses a method and apparatus for establishing at least one trusted communication path for transmitting information from a source to a destination in a network of elements including trusted elements according to a trusted path policy, comprising: receiving, in a resolver, security confidence information identifying each trusted network element of the network and describing at least one security parameter of each of the trusted elements of the network, registering, by the resolver, each of the trusted elements using the security confidence information, generating, from the security confidence information, a trusted element unique trusted path digital certificate for each of the trusted elements, the source, and the destination, transmitting the generated trusted path digital certificates to each of the trusted elements, the source, and the destination, receiving a trusted path query from the source in the resolver, the trusted path query comprising an address of the destination and a trusted path policy, generating trusted communication path information describing the at least one trusted communication path according to the trusted path policy, and the security confidence information, and transmitting trusted communication path information describing at least a portion of the trusted communication path to the source.

A method and apparatus for transmitting information from a source to a destination in a network of elements including trusted elements via at least one trusted communications path according to a trusted path policy is also disclosed. The method comprises transmitting a trusted path policy query from the source to a resolver, the trusted path policy query comprising the trusted path policy and a destination address, receiving trusted communication path information generated by the resolver, the trusted communication path information describing at least a portion of the at least one trusted communication path to the destination generated at least in part from security confidence information of each of the trusted elements and the trusted path policy, and transmitting the information via the trusted communications path according to the trusted communications path information.

Other embodiments are evidenced by an apparatus for performing the foregoing operations.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1:
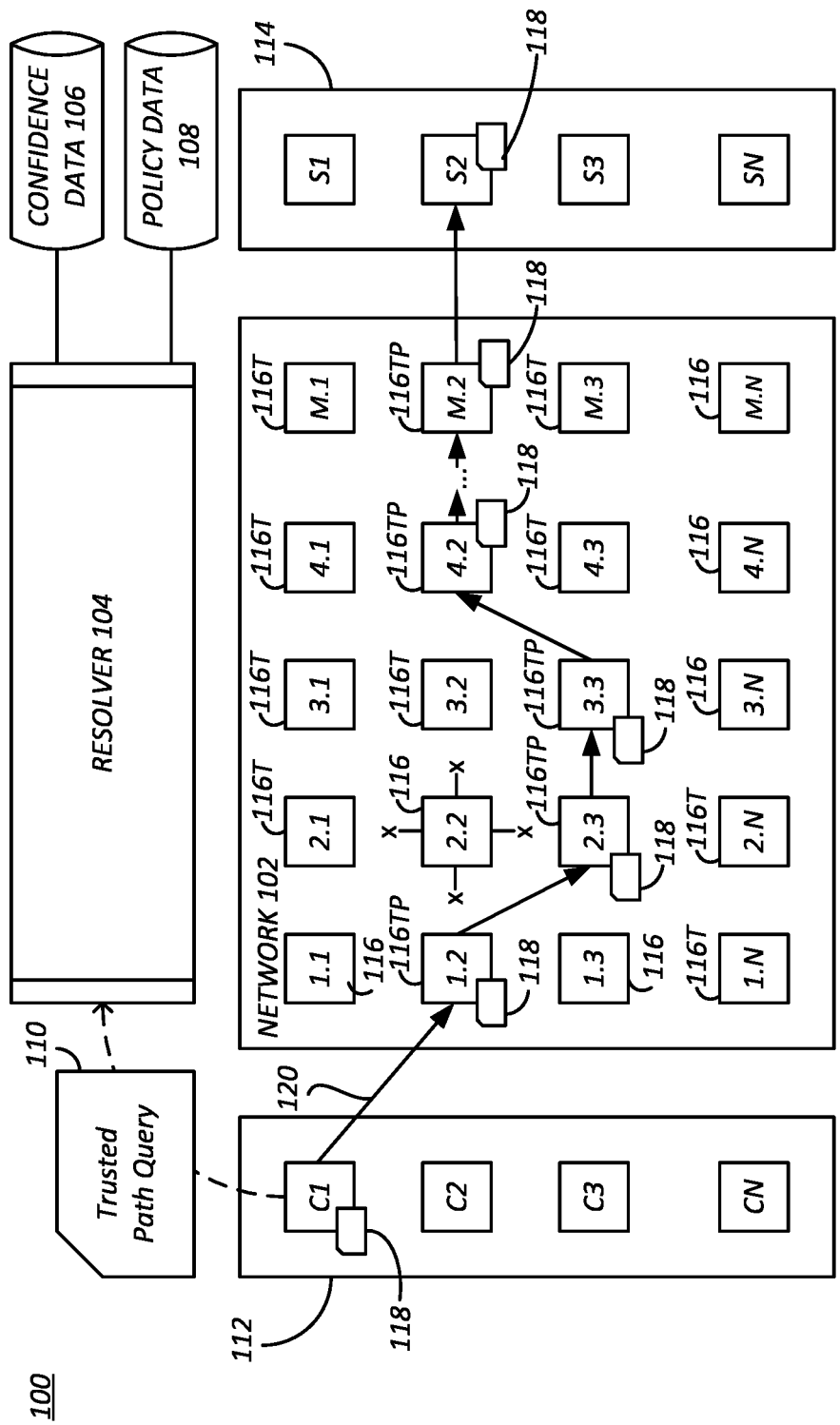
FIG. 1 is a diagram depicting one embodiment of a trusted path capable network.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Definitions

Trusted Path: The defined path from client to server (or segment egress available network elements from better trusted vendors that excludes/avoids untrusted or less trusted network elements.

Trusted Path Resolver: One or more devices implementing a function that aggregates relevant information on network elements, applies the policies to select better trusted elements and avoiding less trusted elements or untrusted elements to ultimately define and establish a trusted path(s).

Trusted Path Capable Network: A network that has a trusted path resolver with applicable element trust confidence scores for network elements in the network and has a trusted path policy defined Trusted Path Policy: An application, service or user specific policy (for example, set within an OS or built into bank or finance application(s) or payment service(s)) to define desired scores (e.g. security scores) against given criteria. These may include default, minimum or best available options.

Trusted Static Route: A route that is defined within a trusted path resolver as more trusted or preferred in the absence of trust criteria or trust information for a network Network Elements: Any hardware, software or service used in a communication path. these include everything from end user devices, radios, tower and cellular equipment, modems, CMTS, ONT, OLT, switches, routers and other network equipment as well as network functions virtualization (such as firewalls and load balancers), and applications or services—both physical servers and cloud based services. Network elements belong to one or more trusted path capable networks, can be virtualized, and exist at the edge or within a core.

Dynamic Path: A communication path that uses both a trusted path and alternative trusted path(s) to complete transactions involving multiple segments or packets and/or larger volume of data Dynamic Path Interval: the time interval to change to an alternate path Element Trust Criteria: Any network element characteristic deemed applicable to trust in the element including (1) hardware (HW), (2) software (SW), (3) encryption, (4) service or application, (5) vendor and (6) additional criteria, as follows:

Hardware: can include silicon/system-on-a-chip (SoC), other electronic components that are used to build the physical device.

Software: can include embedded microcode/boot code, secure code, operating system (OS), application or container SW, versions and security supported features such as CVC or obfuscation as well as vulnerabilities.

Encryption: includes type and strength of encryption.

Application or service; includes categorization of the nature of the underlying data flow including finance, health, personal/private, sensitive or not sensitive.

Vendor: is a characteristic that also crosses prior categories in that the vendor of hardware components, the device, the device software (any level, boot code to application container), or the overall application/service.

Additional criteria includes items that do not fall into the prior categories such as operations, newly exposed vulnerabilities not contained in the software, as well as the identity of the equipment installer.

Element Trust Confidence Score: a relative score for a specific network element across the element trust criteria categories.

Network Security Confidence Information: Raw score information and assessment information of network elements in a given network that can be provided to the resolver for the purpose of evaluating relative risk between the elements.

Network Policy Data: Policies that are loaded to a trusted path resolver to be applied against the network elements.

Trusted Path Query: A client, application or service request for a trusted path connection that includes the desired level of trust (could also be best available or specific requirements including exclusions); alternatively, client proxy could be first capable element in the trusted path capable network.

Connection Policy Requirement: The six categories criteria scoring requirements for a given security level required (i.e., by an application or service or entity . . . see "GOAL") a given application, service or connection, the defined required or desired trust confidence score for specified criteria. In its most simple form, it could be a binary vendor score of 0 or 1 to avoid untrusted vendors' network equipment when possible.

Overview

An overlay to existing infrastructure that establishes trusted paths in a communication network to fulfill a fundamental need to identify and protect a trusted plane of devices and/or applications on a need specific basis is described. Establishing trusted paths operationally fulfills a fundamental need to identify and protect a trusted plane of devices and/or applications on a need specific basis as an overlay to the existing relatively unsecured network.

Cybersecurity Risk Assessments may be based on multiple criteria, some of which is relatively more important than others. These criteria may include vendor, silicon/SoC type or model, individual device, OS, application/container, code signing use (layers boot code to container), encryption and encryption strength, security robustness, specific implementations, installer (example, certified pro installer in CBRS), etc.

There are two fundamental ideas included in this disclosure—(1) a system and method for assessing the system elements to identify potential network path use preferences as higher trust/less risk path (trusted path) and (2) changing the trusted path to an alternate or splitting traffic between diverse trusted paths as a means to disrupt a potential transmission cybersecurity leakage from an element that is part of an established trusted path by changing the trusted path in use during the transmission of information between clients and servers.

The method is summarized as follows: First, one or more trusted path capable networks are established. This is accomplished by (a) a resolver, receiving configuration information related to one or more policies (these set the security levels for acceptable for each element trust criteria), a list of network elements defined within scope of trusted path capable network, element trust criteria information on each network element, (b) determining potential communication path(s) using the resolver, which provides definition to trusted path capable network elements for a given connection, and (c) aligning communication ingress and egress procedures to the defined trusted path, using existing protocols (e.g., router protocols) to the extent possible.

Second, the trusted path is selected based on the configuration information and the desired level of trust for the communication. The trusted path can be changed to use other trusted elements (for example, for edge hardening or core obfuscation) by changing the communication path (dynamic path) at dynamic path intervals to avoid untrusted vendors. Dynamic switch control can be used to interrupt transmission and optionally change the underlying encryption utilized in any of the devices.

The foregoing allows network operators to establish and mandate that security sensitive communications be conveyed over trusted network segments in the context of an overall application or service specific requirements, local organization (business or government entity), or national government policies. The system and method can be implemented in multiple network architectures including physical networks transceiving at different frequencies (optical and RF) and within different medium (wireless and wired). The principles extend to virtualization and to cluster-based entities that have ingress/egress defined or simplified to be treated like a single network elements.

The system and method uses trusted paths as an overlay to existing infrastructure and requires application specific and/or client specific capability to initiate a trusted path policy query (or resolver policy query) or for a client proxy (the first element in a trusted capable path network that receives a communication to automatically utilize best path available in compliance with the loaded resolver policies). As described below, network elements in a trusted path capable network require element characterization based on established element trust criteria.

FIG. 1 is a diagram depicting one embodiment of a trusted path capable network (TPCN) 100, and FIG. 2 is a diagram illustrating exemplary operations that can be performed to receive and register information from the network elements 116 of the TPCN 100 that is later used to define a trusted communication path 120. The TPCN 100 enables communications between one or more client devices 112 such as C1, C2, C3, . . . , CN (also alternatively referred to hereinafter as sources) and one or more server devices 114 such as S1, S2, S3, . . . , SN (also alternatively referred to hereinafter as destinations. The one or more client devices 112 are communicatively coupleable to the one or more server devices 114 via a network 102 of communicatively intercoupleable network elements 116 such as network elements 1.1-M.N. The TPCN 100 also comprises a trusted path resolver 104 (hereinafter simply referred to as resolver 104).

Trusted Network Enablement

Before data can be securely transmitted, an ordinary network must become trusted network enabled. That is accomplished as follows.

Figure 2A:
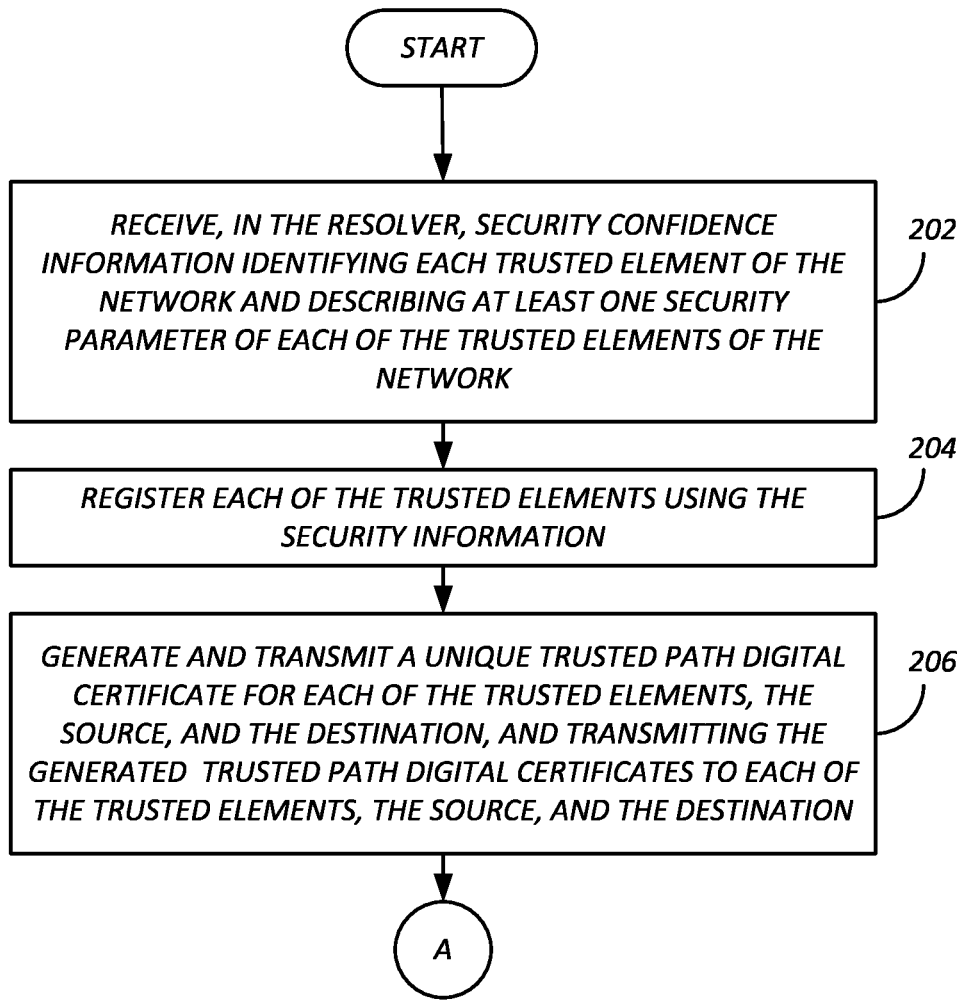
FIG. 2A is a diagram illustrating exemplary operations that can be performed to receive and register information from the network elements of the trusted path capable network that is later used to define a trusted communication path.

FIG. 2A is a diagram illustrating exemplary operations that can be performed to receive and register information from the network elements of the trusted path capable network that is later used to define a trusted communication path. The resolver 104 receives security confidence information from each trusted network element 116T desiring to be regarded as a trusted network element 116T, as shown in block 202. The security confidence information identifies that network element 116 and describes one or more security parameters of the associated network element 116. Such security parameters include, for example, network element 116 characteristics that are relevant to the level of trust that can be ascribed to the network element 116 (referred to as element trust criteria in the above definitions).

The resolver 104 aggregates relevant security confidence information obtained from each trusted network element 116T, stores the confidence information in a confidence information database 106, and registers each of the trusted network elements 116T using the security confidence information, as shown in block 204.

In one embodiment, the registration of the trusted network elements 116T is performed by computing a trust confidence score of each trusted network element 116T based upon the security confidence information received from each trusted network element 116T, and registering each of the trusted network elements 116T according to the trust confidence score. In one example, the computed trust confidence score may be a weighted sum of scores for each relevant characteristic including scores that represent the hardware trustworthiness, software trustworthiness, encryption security, service or application trustworthiness and vendor trustworthiness. Therefore, a trusted network element 116T having a secure SoC architecture and trusted execution environment, with strong encryption from a trusted vendor and installed by a trusted installer will have a higher trust confidence score than a trusted network element 116T having, for example, strong encryption, but no trusted execution environment.

Thereafter, the resolver 104 generates a unique trusted path digital certificate 118 for each of the trusted elements 116T, any sources (client devices 112) and any destination (servers 114) wishing to communicate over the TPCN 100, and transmits the generated trusted path digital certificates 118 to each of the trusted elements 116T, source (client device(s)) 112, and destination device(s) 114, as shown in block 206. Each of the trusted path digital certificates 118 is unique to the trusted network element 116T, and is securely stored by the trusted network element 116T. In one embodiment, each trusted path digital certificate 118 is generated by determining a level of trust of each of the trusted elements from the trust confidence score, and generating a trusted path digital certificate for each trusted network element having the level of trust. In that way, a trusted network element 116T may have a plurality of trusted path digital certificates 118, each corresponding to a different level of trust and hence, used to support communications according to a trusted path policy.

Trusted Path Operation to Transceive Data

Figure 2B:
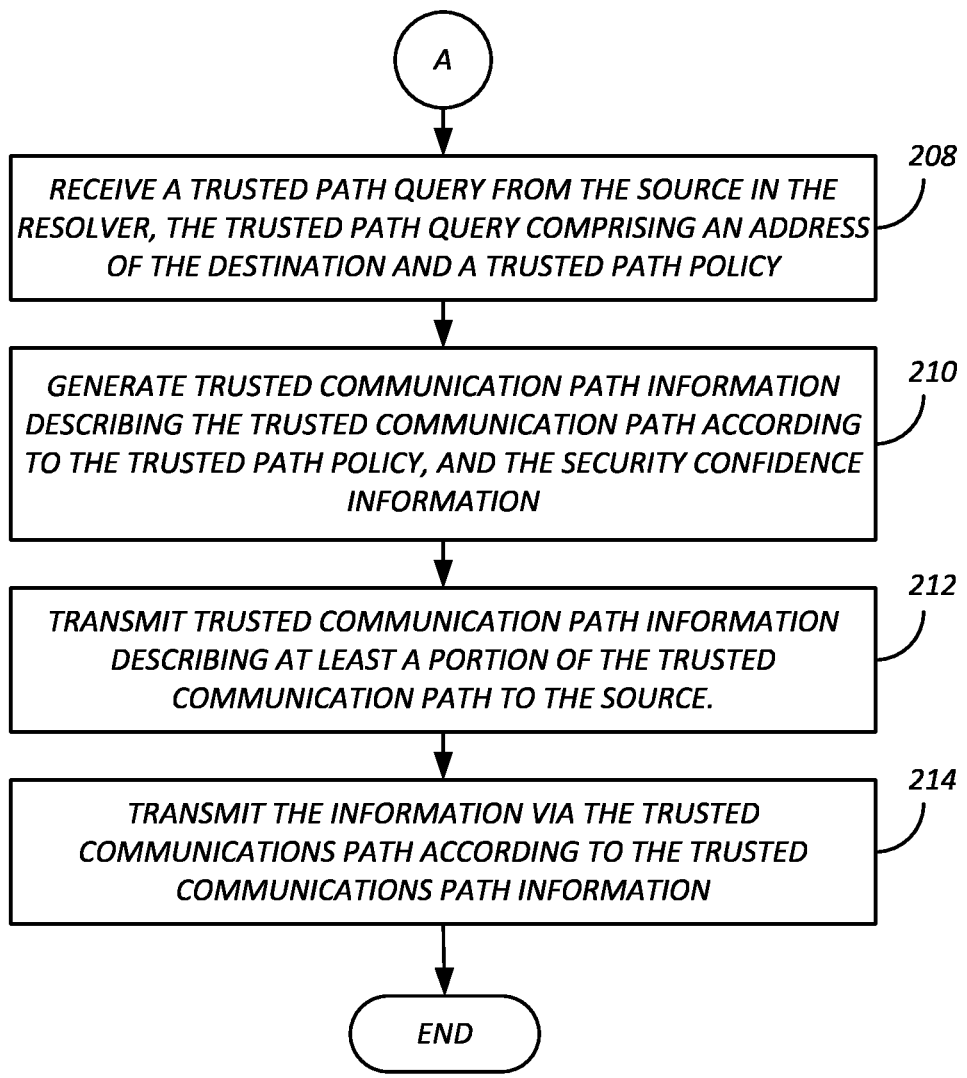
FIG. 2B is a diagram illustrating exemplary operations for transmitting or receiving data on the trusted path communication network.

FIG. 2B is a diagram illustrating exemplary operations for transmitting or receiving data on the TPCN 100. When a source 112 (such as C1) wishes to transmit information to a destination 114, the source 112 transmits a trusted path query 110 to the resolver 104. The resolver 104 receives the trusted path query 110 from the data source 112, as shown in block 208. The trusted path query 110 comprises an address of a destination 114 or sink of the data (e.g. server S2) and the desired trusted path policy defining the trust characteristics (e.g. level of trust) desired by the source 112 and/or destination 114, and an address or identity of the destination 114.

The resolver 104 then generates trusted communication path information describing the trusted communication path 120 according to the trusted path policy specified in the request and the security confidence information provided earlier to the resolver 104 by each trusted network element 116T, as shown in block 210. In one embodiment, this is accomplished by accessing a trusted policy database 108 to determine the relationship between the requested trusted policy and the characteristics of the network elements 116, generating an aggregate trusted path score for each of a plurality of candidate trusted communication paths from the trust confidence score of each of the trusted network elements 116T in the associated candidate trusted communication path, and selecting the trusted communication path 120 according to the aggregate trusted path score, and the trusted path policy in the trusted path query 110. Referring back to FIG. 1, it is noted that there are more than one path from the source 112 to the destination 114 that includes only trusted network elements 116T. An aggregate trusted path score can be computed for each such path, and the selected trusted communications path 120 selected according to the aggregated trusted path scores. For example, instead of routing the data via trusted network element 3.3 116T, the data could have been routed via trusted network element 3.2 116T. The indicated trusted communications path 120 through trusted network element 3.3 116T may have been selected rather than the trusted communication path routed through trusted network element 3.2 116T because, for example, while trusted network element 3.2 116T is trusted, it has a lower confidence score than trusted network element 3.3 116T, or because the trusted path policy mandated that trusted network element 3.2 116T be avoided, or mandated a minimum confidence score of every element in the trusted communication path 120, and trusted network element 3.2 116T did not meet a minimum mandate confidence score.

The trust policy may be selected from one of a plurality of trust policies, including:

Best Trust Policy: This trust policy specifies that the selected trusted communication path 120 is the trusted communications path 120 having the highest aggregated trusted path score.

Minimum Trust Policy: This trust policy specifies that the selected trusted communications path 120 must be no less than a minimum aggregated trusted path score.

Minimum Trusted Element Trust Policy: This trust policy specifies that the selected trusted communication path is any of the plurality of candidate trusted communication paths having no less than a minimum trust confidence score.

Custom Trust Policy: This trust policy specifies that the selected trusted communications path is any of the plurality of candidate trusted communications paths in which all of the trusted network elements 116T have a desired combination of the security parameter values.

The resolver 104 then transmits trusted communication path information describing at least a portion of the trusted communication path 120 to the source 112, as shown in block 212.

The source 112 then receives trusted communication path information generated by the resolver 104. The trusted communication path information describes at least a portion of the trusted communication path 120 to the destination 114, and is generated at least in part from the security confidence information of each of the trusted network elements 116T and the trusted path policy of the trusted path query 110. Finally, the source 112 transmits the information via trusted network elements 116TP the trusted communications path 120 according to the trusted communications path information, as shown in block 214.

Operational Details

Figure 3A:
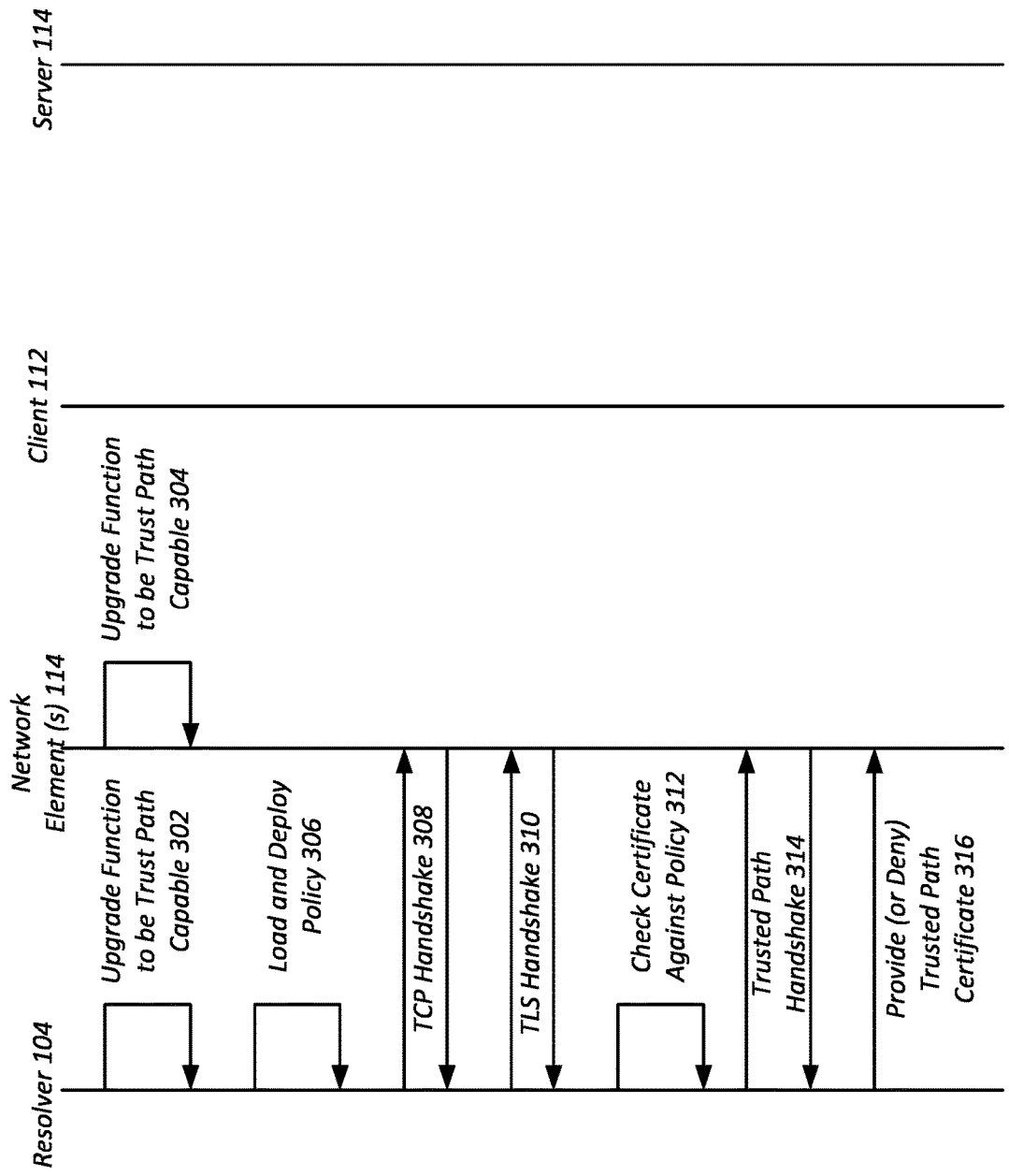
FIGS. 3A and 3B is a diagram illustrating additional details regarding the foregoing operations.
Figure 3B:
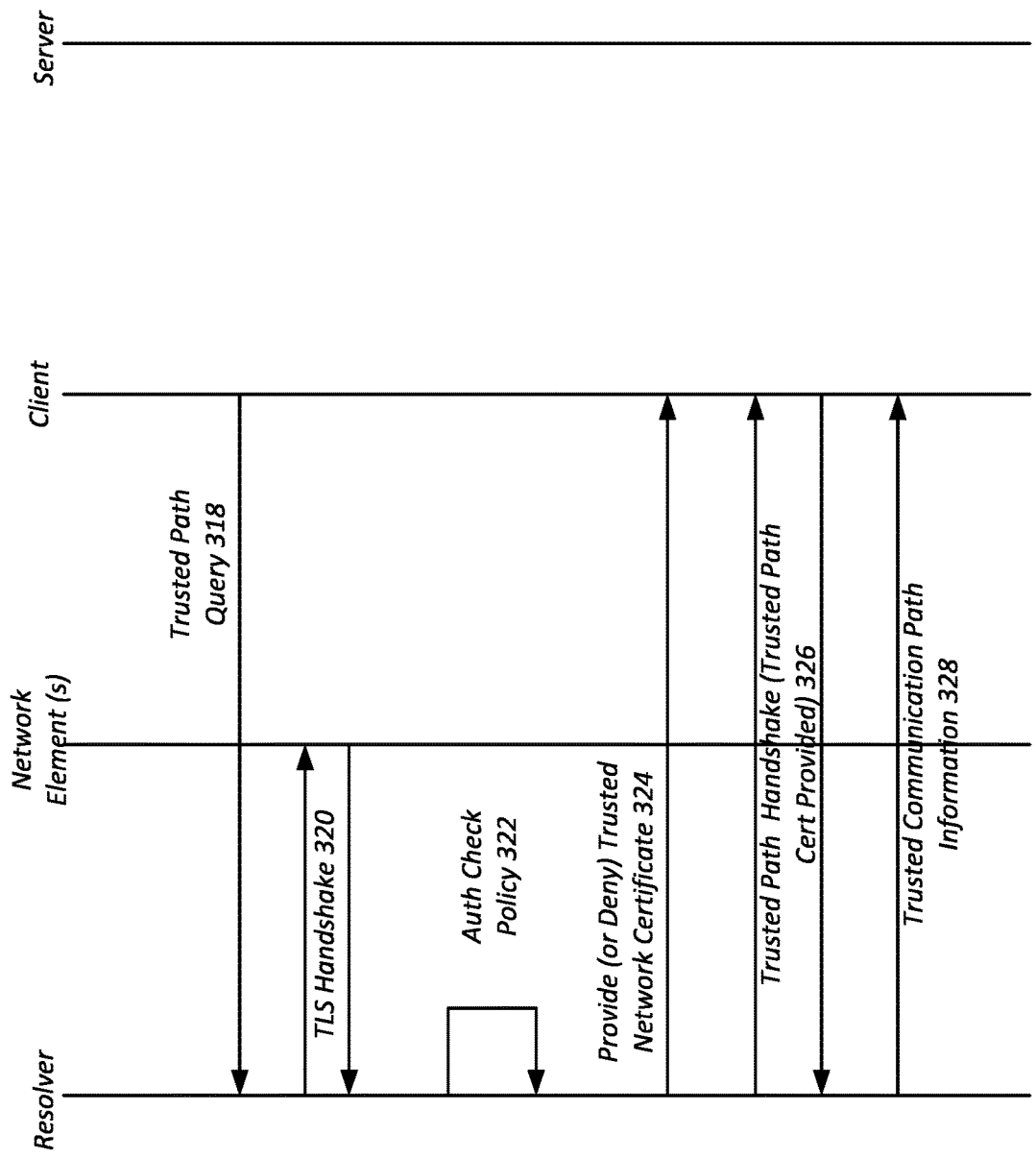

FIGS. 3A and 3B is a diagram illustrating additional details regarding the foregoing operations. In step 302, the resolver 104 upgrades its function to be trusted path capable, thus adding the capability of the resolver 104 to perform the operations describe herein (e.g. receive security confidence information from network elements 116T, register the security confidence information, generate and transmit trusted path certificates 118 to each trusted network element 116T as well as sources or clients 112 and servers 114, and respond to trusted path queries 110. In step 304, the network elements 116 seeking to be qualified to be a trusted path network element 116T perform the functional upgrades required to meet an element trust criteria (for example, a design or implementation related to hardware (e.g. a secure processor), software (e.g. a trusted execution environment), encryption (e.g. minimum 256 DES), (4) service or application, (5) vendor (i.e. vendor must be certified secure). In step 306, the resolver 104 loads trusted path policies. These policies define desired security scores against specific criteria, and are also deployed to the trusted network elements 116T. In step 308, the resolver 104 performs a transmission control protocol (TCP) handshake with each of the trusted network elements 116T to initiate communications.

In the TCP handshake, the initiator sends a segment with a synchronize sequence number (SYN) that informs the responder that the client would like to communicate with the responder and the sequence number it will begin transmitting segments with. The responder responds with an acknowledgement signal that also signifies the sequence number it will use to begin transmitting segments. Finally, the initiator acknowledges the response of the responder, and they begin communicating using the sequence numbers indicated.

Next, in step 310, the resolver 104 and the trusted network elements 116T perform a transport layer security (TLS) handshake. In the TLS handshake, the resolver 104 and network elements 116 specify the version of TLS to be used in communications, decide on which cipher suites will be used to communicate, authenticate the identity of the trusted network element 116T via the network element's public key and the digital signature of the certificate authority that issued the network element's certificate, and generates session keys that can be used for symmetric encryption after the handshake is complete. A 'hello' message that includes the TLS version supported by the initiator, the cipher suites supported, and a string of random bytes initiates the handshake. The responder to this message replies with its digital certificate (including the recipient's public key), the responder's chosen cipher suite, and a random string of bytes generated by the responder. The initiator receives the certificate, and verifies the certificate with the certificate authority that issued it. The initiator and responder then generate session keys. If an RSA key exchange is used, the initiator then sends another random string of bytes, encrypted by the recipient's public key, which the responder decrypts. Session keys are then generated by the initiator and the responder using the initiator's random string, the responder's random string, and the another random string of bytes. If a Diffie-Hellman paradigm is used, the initiator sends it's DH parameter to the responder, and the initiator and responder each compute session keys for secure communication.

The resolver 104 checks the digital certificate(s) received from the trusted network elements 116T in the TLS handshake to verify that the network element(s) 116 are suitable candidates to be aggregated into the group of trusted network elements 116T eligible to be used for a trusted communications path 120, as shown in step 312. If the network element 116 is a suitable candidate, the resolver 104 initiates a trusted path handshake with the trusted network element 116T, as shown in step 314 (the trusted path handshake can include an exchange of digital certificates or the exchange of public keys and the generation of symmetric keys), and depending on the result, provides (or denies) a trusted path certificate 118 to the requesting trusted network element 116T, as shown in step 316. The trusted network element 116T stores the trusted path certificate 118 for later use in transmitting information when it is defined as a member of a trusted communications path 120.

Turning to FIG. 3B, when a source 112 (such as client C1) wishes to transmit information to a destination 114 (such as server S2), the source 112 transmits a trusted path query 110 to the resolver 104, as shown in step 318. The trusted path query 110 is a request for a trusted path connection with desired communications channel characteristics. The desired communications channel characteristics may be a particular level of trust, other specific trust or throughput requirements, including enforced inclusions (e.g. network elements 116 that must be included in the trusted path 120) or enforced exclusions (e.g. network elements 116 that cannot be included in the trusted path 120). The resolver 104 responds by performing a TLS handshake using the same techniques described above with respect to the resolver's TLS handshake with the network elements 116, as shown in step 320. Using the information obtained in the TLS handshake (e.g. the verified identity of the source 112 and the trustworthiness of the source 112), the resolver 104 checks to determine if the source 112 is authorized to transmit data via a trusted communications path 120, as shown in step 322. Depending on the outcome of this assessment, the resolver 104 provides (or denies) a trusted network certificate 118 to the source 112, as shown in step 324. A trusted path handshake (TPH) is then performed, as shown in step 326. The TPH is analogous to the TCP handshake, except that instead of a standard digital certificates from a certificate authority being exchanged and verified, the trusted path digital certificates 118 of the participants of the handshake are exchanged, and used to verify the identity of each participant and to generate symmetric encryption keys.

Trusted communication path information that describes at least part of the trusted communications path 120 complying with the requirements of the trusted path query 110 is then transmitted to at least the source 112, as shown in step 328.

In one embodiment, the trusted communication path information sent by the resolver 104 includes the address of each of the trusted network elements 116T in the defined trusted communications path 120 to the destination 114, and this information is used by each trusted network element 116T in the trusted communications path 120 to identify the next trusted network element 116T in the trusted communications path 120 and to transmit the information to that next trusted network element 116T. For example, with respect to the representative trusted communications path 120 illustrated in FIG. 1, the trusted communications path information may include a serial concatenation of the internet protocol (IP) address of each element in the trusted communications path (e.g. a concatenation of the IP address of network elements 1.2, 2.3, 3.3, 4.2, . . . , and M.2), and each trusted network element 116T in the trusted communication path 120 may retrieve the relevant portion of the concatenated IP address to identify the next trusted network element 116T to which the data is to be sent. In other embodiments, MAC addresses or other means of identifying the trusted communication path are provided.

In still another embodiment, rather than communicate the address of each trusted network element 116T in the trusted communications path 120 to the source or client 112, the resolver 104 instead communicates an identifier of the message or data to be transmitted along with the only address of the next trusted network element 116T (or the destination or server 114, if the trusted network element 116T is the last in the trusted communications path (e.g. trusted network element M.2 in the example illustrated in FIG. 1) to each trusted network element 116T in the trusted communications path 120. When each trusted network element 116T receives a message, it checks the identifier of the incoming message and if there is matching network address identifying the next trusted network element 116T in the trusted communications path 120, it forwards the message to that identified trusted network element 116T.

In still another embodiment, the trusted communication path information generated by the resolver 104 includes the address each of the trusted network elements 116T in the network meeting the required parameters of the trusted path query 110, thus providing the source or client 112 with potentially more than one trusted communications path to choose from.

In still another embodiment, the resolver 104 transmits a list such as a trusted path routing table having an address to all trusted network elements 116T to each trusted network element 116T. In this embodiment, the source 112 selects a first trusted network element 116T from the list and transmits the information to that trusted network elements 116T. The trusted network element 116T receiving that information then selects a second trusted network element 116T from the list to transmit information to the next trusted network element 116T, and this process completes until the message is delivered to the destination 114.

In still another embodiment, the source 112 is not provided a list of the address of trusted network elements 116T, nor is the address of such trusted network elements 116T provided to the trusted network elements 116T. Instead, the source 112 attempts a TPH with a network element 116 that is a candidate to transmit the data to, and only sends the data to this network element 116 if the TPH with that network element is successful (thus indicating it is a trusted network element 116T). Since this process involves exchanging digital certificates that indicate the trust level of the network element 116, and data is not sent unless there is a successful TPH handshake, it is assured that the data will pass via a trusted communications path 120, albeit one that is not predefined, and one for which it is difficult to guarantee throughput or delivery.

Figure 4:
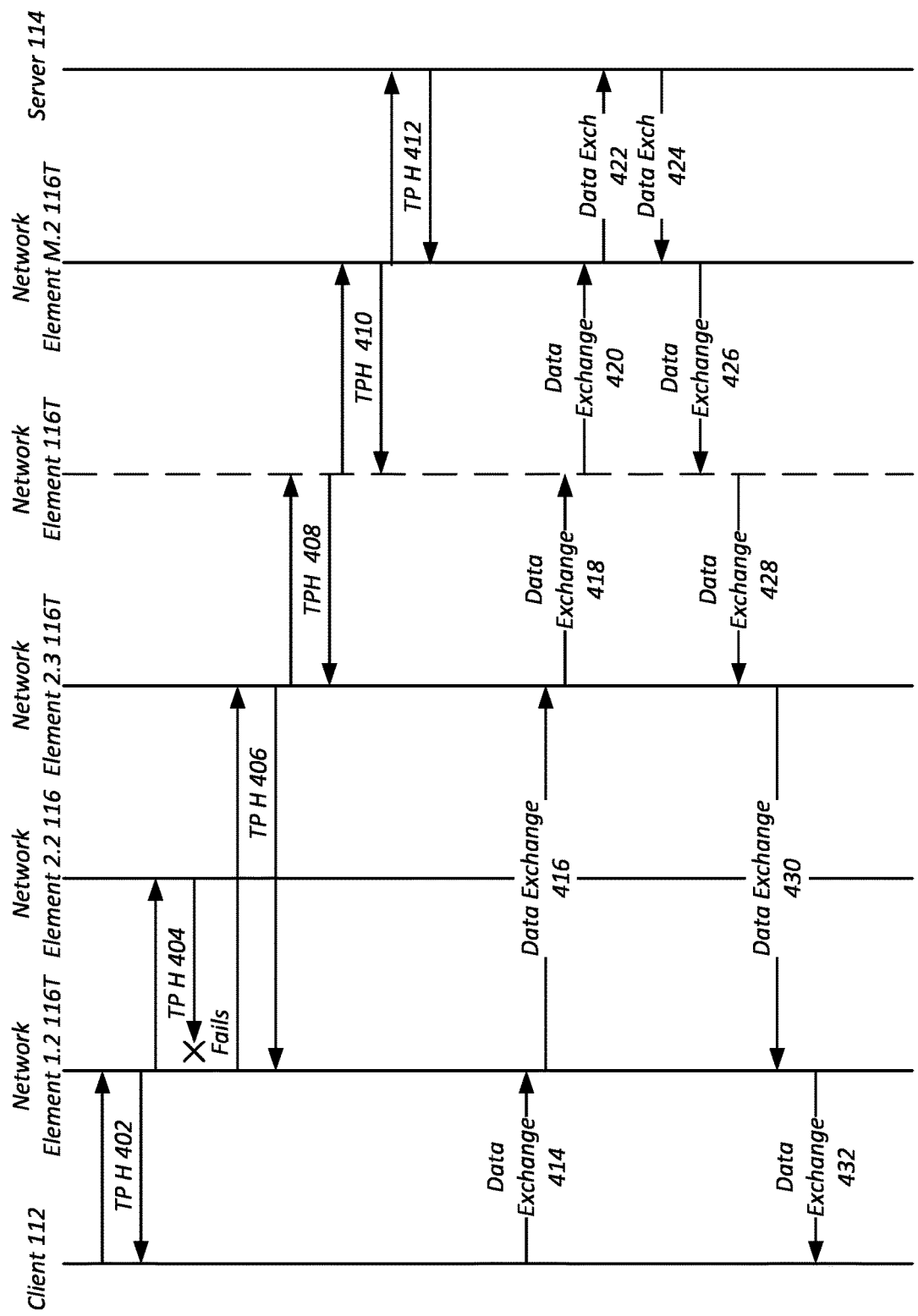
FIG. 4 is a diagram illustrating further details regarding the transmission and reception of data via the trusted communications path.

FIG. 4 is a diagram illustrating further details regarding the transmission and reception of data via the trusted communications path 120. In step 402, a TPH is initiated by the client with the first trusted network element 116T in the trusted communication path 120. This TPH is executed in a similar fashion as the TLS handshake described above, except that the digital certificates exchanged in this handshake are the trusted path digital certificates 118 described above, and that these digital certificates 118 are checked to verify that the network element 116 is in fact a trusted network element 116T and a suitable recipient of the data on trusted communications path 120 in accordance with the requirements specified in the trusted path query 110. In step 404, trusted network element 1.2 116T attempts to perform a TPH handshake with network element 2.2 116. However, since the trusted path certificate 118 of network element 116T is either non-existent (was never provided), has expired, or is otherwise defective, the TPH handshake fails. Since this TPH fails, trusted network element 1.2 116T attempts a TPH handshake with another candidate network element, namely trusted network element 2.3 116T. As this network element is in fact a trusted network element meeting the requirements of the trusted path query 110, the TPH succeeds, as shown in step 406. This process continues, with steps 408 and 410 indicating a successful TPH with the next succeeding trusted network element 116T in the trusted communication path 120, and the TPH of step 412 indicating a successful TPH with the intended data recipient, the server 114. Thus, each trusted network element 116T of the trusted communication path 120 authenticates the next trusted network element 116T of the trusted communications path 120 using the digital certificate 118 of the next trusted element. As described below, this occurs before transmitting the information to the next trusted network element 116T of the trusted communications path 120.

Steps 414 indicates data transmission from the source 112 to the first trusted network element 2.2 116T and steps 416-422 indicate data transmission between the trusted network elements 116T in the trusted communication path 120 and the server 114. Steps 424 through 432 indicate transmission of responsive data from the server 114 to the client using the trusted network elements 116T in the trusted communications path 120.

Although the foregoing is described with all of the TPHs being successfully performed between each element in the trusted communications path 120 before the data itself is transmitted, this need not be the case. Instead, each trusted network element 116T may receive data from an upstream trusted network element 116T and then proceed to attempt a TPH with network elements 116 that it believes to be trusted network elements 116T, and transmit the data to subsequent network element 116 only if that network element 116 is a trusted network element 116T.

Hardware Environment

Figure 5:
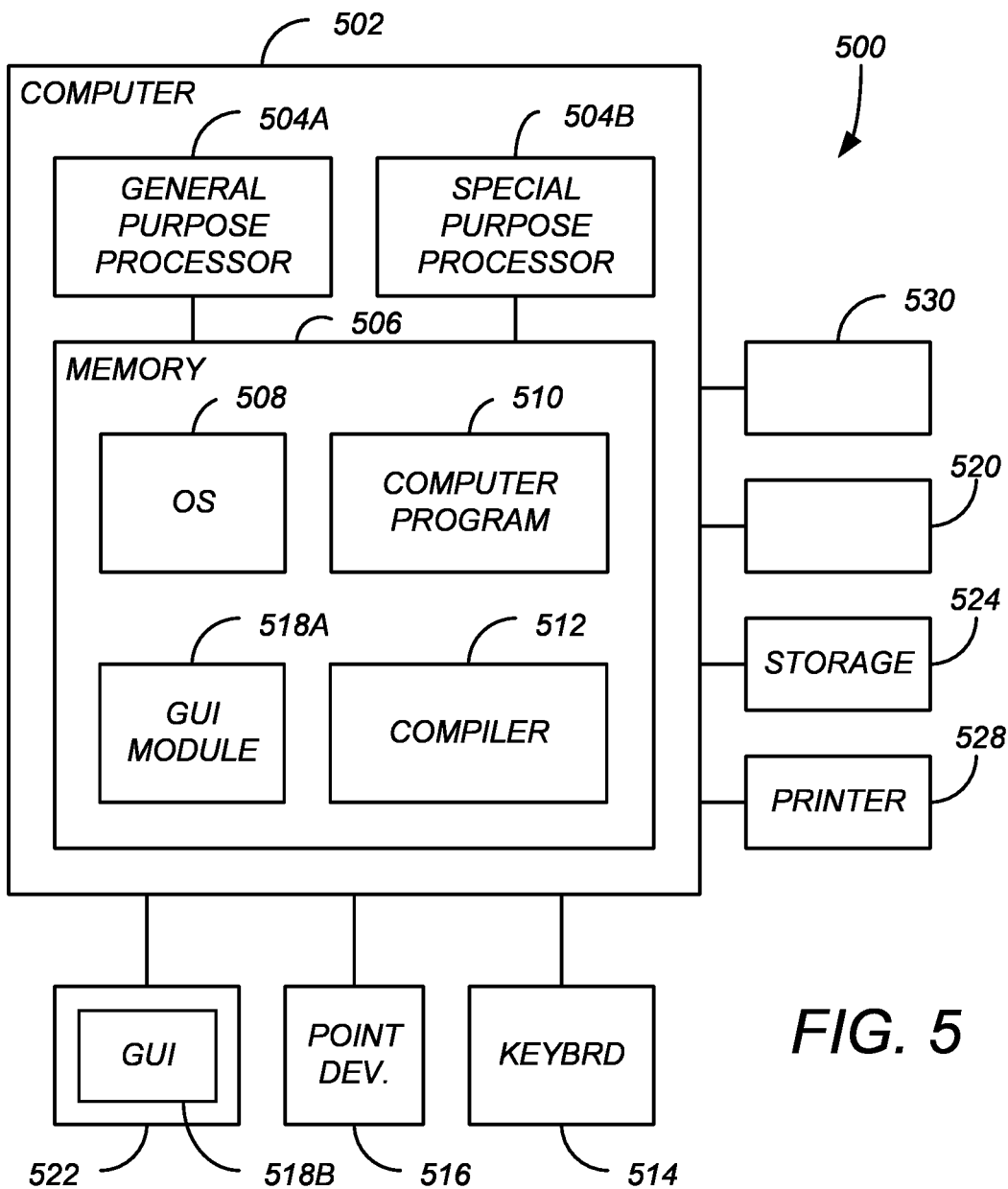
FIG. 5 is a diagram illustrating an exemplary computer system 500 that could be used to implement elements of the trusted path capable network.

FIG. 5 is a diagram illustrating an exemplary computer system 500 that could be used to implement elements of the trusted path capable network, including the network elements 116, the resolver 104, the client(s) 112, and the server(s) 114. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The foregoing discloses an apparatus, method and system for establishing at least one trusted communication path for transmitting information from a source to a destination in a network of elements including trusted elements according to a trusted path policy. One embodiment is evidenced by a method that includes: receiving, in a resolver, security confidence information identifying each trusted network element of the network and describing at least one security parameter of each of the trusted elements of the network; registering, by the resolver, each of the trusted elements using the security confidence information; generating, from the security confidence information, a trusted element unique trusted path digital certificate for each of the trusted elements, the source, and the destination; transmitting the generated trusted path digital certificates to each of the trusted elements, the source, and the destination; receiving a trusted path query from the source in the resolver, the trusted path query including an address of the destination and a trusted path policy; generating trusted communication path information describing the at least one trusted communication path according to the trusted path policy, and the security confidence information; and transmitting trusted communication path information describing at least a portion of the trusted communication path to the source.

Implementations may include one or more of the following features:

Any of the methods described above, wherein registering, by the resolver, each of the trusted elements using the security confidence information includes: computing a trust confidence score of each trusted element based on the security confidence information from each trusted network element; and registering each of the trusted elements according to the trust confidence score.

Any of the methods described above, wherein the security confidence information includes one or more of: hardware security confidence information of the trusted element; software security confidence information of the trusted element; and vendor information regarding a vendor of the trusted element.

Any of the methods described above, wherein generating trusted communication path information describing the trusted communication path according to the trusted path policy, and the security confidence information includes: generating an aggregate trusted path score for each of a plurality of candidate trusted communication paths from the trust confidence score of each of the network elements in each candidate trusted communication path; selecting the trusted communication path according to the aggregate trusted path score and the trusted path policy; and generating the trusted communication path information from the selected trusted communication path.

Any of the methods described above, wherein the trusted path policy includes one of: a best trust policy, specifying that the trusted communication path is the one of a plurality of candidate trusted communication paths having a highest aggregated trusted path score; and a minimum trust policy, specifying that the trusted communication path is any of the plurality of candidate trusted communication paths having no less than a minimum aggregated trusted path score; a minimum trusted element trust policy, specifying that the selected trusted communication path is any of the plurality of candidate trusted communication paths having a trusted network element having no less than a minimum trust confidence score; and a custom trust policy, specifying that the selected trusted communication path is any of the plurality of candidate trusted communications paths having in which all of the trusted elements have a desired combination of the security parameter values.

Any of the methods described above, wherein generating a unique trusted path digital certificate for each of the trusted elements, the source, and the destination, and transmitting the generated trusted path digital certificates to each of the trusted elements, the source, and the destination includes: determining a level of trust of each of the trusted elements from the trust confidence score; and generating the trusted path digital certificate for each trusted network element having the level of trust.

Any of the methods described above, wherein the trusted communication path information describes the trusted communication path from the source to the destination.

One embodiment is evidenced by an apparatus for establishing at least one trusted communication path for transmitting information from a source to a destination in a network of elements including trusted elements according to a trusted path policy, including: a processor; a memory, communicatively coupled to the processor, the memory storing processor instructions including instructions for: receiving security confidence information identifying each trusted network element of the network and describing at least one security parameter of each of the trusted elements of the network; registering, each of the trusted elements using the security confidence information; generating, from the security confidence information, a trusted element unique trusted path digital certificate for each of the trusted elements, the source, and the destination; transmitting the generated trusted path digital certificates to each of the trusted elements, the source, and the destination; receiving a trusted path query from the source in the resolver, the trusted path query including an address of the destination and a trusted path policy; generating trusted communication path information describing the at least one trusted communication path according to the trusted path policy, and the security confidence information. The apparatus also includes transmitting trusted communication path information describing at least a portion of the trusted communication path to the source.

Implementations may include one or more of the following features:

Any apparatus described above, wherein the instructions for registering each of the trusted elements using the security confidence information include processor instructions for: computing a trust confidence score of each trusted element based on the security confidence information from each trusted network element; and registering each of the trusted elements according to the trust confidence score.

Any apparatus described above, wherein the security confidence information includes one or more of: hardware security confidence information of the trusted element; software security confidence information of the trusted element; and vendor information regarding a vendor of the trusted element.

Any apparatus described above, wherein the processor instructions for generating trusted communication path information describing the trusted communication path according to the trusted path policy, and the security confidence information includes: generating an aggregate trusted path score for each of a plurality of candidate trusted communication paths from the trust confidence score of each of the network elements in each candidate trusted communication path; selecting the trusted communication path according to the aggregate trusted path score and the trusted path policy; and generating the trusted communication path information from the selected trusted communication path.

Any apparatus described above, wherein the trusted path policy includes one of: a best trust policy, specifying that the trusted communication path is the one of a plurality of candidate trusted communication paths having a highest aggregated trusted path score; and a minimum trust policy, specifying that the trusted communication path is any of the plurality of candidate trusted communication paths having no less than a minimum aggregated trusted path score; a minimum trusted element trust policy, specifying that the trusted communication path is any of the plurality of candidate trusted communication paths having a trusted network element having no less than a minimum trust confidence score; and a custom trust policy, specifying that the trusted communication path is any of the plurality of candidate trusted communications paths having in which all of the trusted elements have a desired combination of the security parameters.

Any apparatus described above, wherein the processor instructions for generating a unique trusted path digital certificate for each of the trusted elements, the source, and the destination, and transmitting the generated trusted path digital certificates to each of the trusted elements, the source, and the destination include processor instructions for: determining a level of trust of each of the trusted elements from the trust confidence score; and generating the trusted path digital certificate for each trusted network element having the level of trust.

Any apparatus described above, wherein the trusted communication path information describes the trusted communication path from the source to the destination.

Another embodiment is evidenced by a method of transmitting information from a source to a destination in a network of elements including trusted elements via at least one trusted communications path according to a trusted path policy, including: transmitting a trusted path policy query from the source to a resolver, the trusted path policy query including the trusted path policy and a destination address; receiving trusted communication path information generated by the resolver, the trusted communication path information describing at least a portion of the at least one trusted communication path to the destination generated at least in part from security confidence information of each of the trusted elements and the trusted path policy; and transmitting the information via the trusted communications path according to the trusted communications path information. wherein the resolver: receives the security confidence information of each of the trusted elements of the network, the security confidence information having at least one security parameter of the associated trusted element; registers each of the trusted elements using the security confidence information; generates a unique trusted communications path digital certificate for each of the source, the destination, and the trusted elements of the network; and provides each respective unique trusted path digital certificate to the source, the destination and each respective trusted element in the network.

Implementations may include one or more of the following features:

Any of the methods described above,

Any of the methods described above, wherein the security confidence information includes one or more of: hardware security confidence information of the trusted element; software security confidence information of the trusted element; and vendor information regarding a vendor of the trusted element.

Any of the methods described above, wherein: each trusted element of the trusted communication path authenticates the next trusted element of the trusted communications path according to the trusted communication path digital certificate of the next trusted element before transmitting the information to the next trusted element of the trusted communications path.

Any of the methods described above, wherein: each trusted element of the trusted communication path authenticates the next trusted element of the trusted communications path according to the trusted communication path digital certificate of the next trusted element before commencing transmission of the information on the trusted communications path.

Any of the methods described above, wherein: the trusted communication path information includes an address of only a first trusted element of the trusted communication path; the resolver further transmits a trusted path routing table having an address to each trusted element in the network; and each trusted element the trusted communication path determines the next trusted element in the trusted communications path according to the trusted path routing table of the respective trusted element of the trusted communications path.

Any of the methods described above, wherein: the trusted communication path information includes an address to each trusted element in the trusted communication path; and the trusted communication path information is received from the resolver in the source and transmitted from the source to a first trusted element in the trusted communications path, and thereafter transmitted from each trusted element in the trusted communications path to the next trusted element in the trusted communications path.

Another embodiment is evidenced by an apparatus for transmitting information from a source to a destination in a network of elements including trusted elements via at least one trusted communications path according to a trusted path policy, including: a processor; a memory, communicatively coupled to the processor, the memory storing processor instructions including processor instructions for: transmitting a trusted path policy query from the source to a resolver, the trusted path policy query including the trusted path policy and a destination address; receiving trusted communication path information generated by the resolver, the trusted communication path information describing at least a portion of the at least one trusted communication path to the destination generated at least in part from security confidence information of each of the trusted elements and the trusted path policy; and transmitting the information via the trusted communications path according to the trusted communications path information. wherein the resolver: receives the security confidence information of each of the trusted elements of the network, the security confidence information having at least one security parameter of the associated trusted element; registers each of the trusted elements using the security confidence information; generates a unique trusted path digital certificate for each of the source, the destination, and the trusted elements of the network; and provides each respective unique trusted path digital certificate to the source, the destination and each respective trusted element in the network.

Implementations may include one or more of the following features:

Any apparatus described above, wherein the security confidence information includes one or more of: hardware security confidence information of the trusted element; software security confidence information of the trusted element; and vendor information regarding a vendor of the trusted element.

Any apparatus described above, wherein: each trusted element of the trusted communication path authenticates the next trusted element of the trusted communications path according to the trusted communication path digital certificate of the next trusted element before transmitting the information to the next trusted element of the trusted communications path.

Any apparatus described above, wherein: each trusted element of the trusted communication path authenticates the next trusted element of the trusted communications path according to the trusted communication path digital certificate of the next trusted element before commencing transmission of the information on the trusted communications path.

Any apparatus described above, wherein: the trusted communication path information includes an address of only a first trusted element of the trusted communication path; the resolver further transmits a trusted path routing table having an address to each trusted element in the network; and each trusted element the trusted communication path determines the next trusted element in the trusted communications path according to the trusted path routing table of the respective trusted element of the trusted communications path.

Any apparatus described above, wherein: the trusted communication path information includes an address to each trusted element in the trusted communication path; and the trusted communication path information is received from the resolver in the source and transmitted from the source to a first trusted element in the trusted communications path, and thereafter transmitted from each trusted element in the trusted communications path to the next trusted element in the trusted communications path.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of establishing at least one trusted communication path for transmitting information from a source to a destination in a network of elements including trusted elements according to a trusted path policy, comprising:
    receiving, in a resolver, security confidence information identifying each trusted network element of the network and describing at least one security parameter of each of the trusted elements of the network;
    registering, by the resolver, each of the trusted elements using the security confidence information;
    generating, from the security confidence information, a trusted element unique trusted path digital certificate for each of the trusted elements, the source, and the destination;
    transmitting the generated trusted path digital certificates to each of the trusted elements, the source, and the destination;
    receiving a trusted path query from the source in the resolver, the trusted path query comprising an address of the destination and a trusted path policy;
    generating trusted communication path information describing the at least one trusted communication path according to the trusted path policy, and the security confidence information; and
    transmitting trusted communication path information describing at least a portion of the trusted communication path to the source.

2. The method of claim 1, wherein registering, by the resolver, each of the trusted elements using the security confidence information comprises:
    computing a trust confidence score of each trusted element based on the security confidence information from each trusted network element; and
    registering each of the trusted elements according to the trust confidence score.

3. The method of claim 2, wherein the security confidence information comprises one or more of:
    hardware security confidence information of the trusted element;
    software security confidence information of the trusted element; and
    vendor information regarding a vendor of the trusted element.

4. The method of claim 2, wherein generating trusted communication path information describing the trusted communication path according to the trusted path policy, and the security confidence information comprises:
    generating an aggregate trusted path score for each of a plurality of candidate trusted communication paths from the trust confidence score of each of the network elements in each candidate trusted communication path;
    selecting the trusted communication path according to the aggregate trusted path score and the trusted path policy; and
    generating the trusted communication path information from the selected trusted communication path.

5. The method of claim 2, wherein the trusted path policy comprises one of:
    a best trust policy, specifying that the trusted communication path is the one of a plurality of candidate trusted communication paths having a highest aggregated trusted path score; and
    a minimum trust policy, specifying that the trusted communication path is any of the plurality of candidate trusted communication paths having no less than a minimum aggregated trusted path score;
    a minimum trusted element trust policy, specifying that the selected trusted communication path is any of the plurality of candidate trusted communication paths having a trusted network element having no less than a minimum trust confidence score; and
    a custom trust policy, specifying that the selected trusted communication path is any of the plurality of candidate trusted communications paths having in which all of the trusted elements have a desired combination of the security parameter values.

6. The method of claim 2, wherein generating a unique trusted path digital certificate for each of the trusted elements, the source, and the destination, and transmitting the generated trusted path digital certificates to each of the trusted elements, the source, and the destination comprises:
    determining a level of trust of each of the trusted elements from the trust confidence score; and
    generating the trusted path digital certificate for each trusted network element having the level of trust.

7. The method of claim 1, wherein the trusted communication path information describes the trusted communication path from the source to the destination.

8. An apparatus for establishing at least one trusted communication path for transmitting information from a source to a destination in a network of elements including trusted elements according to a trusted path policy, comprising:
    a processor;
    a memory, communicatively coupled to the processor, the memory storing processor instructions including instructions for:
        receiving security confidence information identifying each trusted network element of the network and describing at least one security parameter of each of the trusted elements of the network;

registering, each of the trusted elements using the security confidence information;
generating, from the security confidence information, a trusted element unique trusted path digital certificate for each of the trusted elements, the source, and the destination;
transmitting the generated trusted path digital certificates to each of the trusted elements, the source, and the destination;
receiving a trusted path query from the source in the resolver, the trusted path query comprising an address of the destination and a trusted path policy;
generating trusted communication path information describing the at least one trusted communication path according to the trusted path policy, and the security confidence information; and
transmitting trusted communication path information describing at least a portion of the trusted communication path to the source.

9. The apparatus of claim 8, wherein the instructions for registering each of the trusted elements using the security confidence information comprise processor instructions for:
computing a trust confidence score of each trusted element based on the security confidence information from each trusted network element; and
registering each of the trusted elements according to the trust confidence score.

10. The apparatus of claim 9, wherein the security confidence information comprises one or more of:
hardware security confidence information of the trusted element;
software security confidence information of the trusted element; and
vendor information regarding a vendor of the trusted element.

11. The apparatus of claim 9, wherein the processor instructions for generating trusted communication path information describing the trusted communication path according to the trusted path policy, and the security confidence information comprises:
generating an aggregate trusted path score for each of a plurality of candidate trusted communication paths from the trust confidence score of each of the network elements in each candidate trusted communication path;
selecting the trusted communication path according to the aggregate trusted path score and the trusted path policy; and
generating the trusted communication path information from the selected trusted communication path.

12. The apparatus of claim 9, wherein the trusted path policy comprises one of:
a best trust policy, specifying that the trusted communication path is the one of a plurality of candidate trusted communication paths having a highest aggregated trusted path score; and
a minimum trust policy, specifying that the trusted communication path is any of the plurality of candidate trusted communication paths having no less than a minimum aggregated trusted path score;
a minimum trusted element trust policy, specifying that the trusted communication path is any of the plurality of candidate trusted communication paths having a trusted network element having no less than a minimum trust confidence score; and
a custom trust policy, specifying that the trusted communication path is any of the plurality of candidate trusted communications paths having in which all of the trusted elements have a desired combination of the security parameters.

13. The apparatus of claim 9, wherein the processor instructions for generating a unique trusted path digital certificate for each of the trusted elements, the source, and the destination, and transmitting the generated trusted path digital certificates to each of the trusted elements, the source, and the destination comprise processor instructions for:
determining a level of trust of each of the trusted elements from the trust confidence score; and
generating the trusted path digital certificate for each trusted network element having the level of trust.

14. The apparatus of claim 8, wherein the trusted communication path information describes the trusted communication path from the source to the destination.

15. An apparatus for establishing at least one trusted communication path for transmitting information from a source to a destination in a network of elements including trusted elements according to a trusted path policy, comprising:
means for receiving security confidence information identifying each trusted network element of the network and describing at least one security parameter of each of the trusted elements of the network;
means for registering each of the trusted elements using the security confidence information;
means for generating, from the security confidence information, a trusted element unique trusted path digital certificate for each of the trusted elements, the source, and the destination;
means for transmitting the generated trusted path digital certificates to each of the trusted elements, the source, and the destination;
means for receiving a trusted path query from the source in the resolver, the trusted path query comprising an address of the destination and a trusted path policy;
means for generating trusted communication path information describing the at least one trusted communication path according to the trusted path policy, and the security confidence information; and
means for transmitting trusted communication path information describing at least a portion of the trusted communication path to the source.

16. The apparatus of claim 15, wherein the means for registering each of the trusted elements using the security confidence information comprises:
means for computing a trust confidence score of each trusted element based on the security confidence information from each trusted network element; and
means for registering each of the trusted elements according to the trust confidence score.

17. The apparatus of claim 16, wherein the security confidence information comprises one or more of:
hardware security confidence information of the trusted element;
software security confidence information of the trusted element; and
vendor information regarding a vendor of the trusted element.

18. The apparatus of claim 16, wherein the means for generating trusted communication path information describing the trusted communication path according to the trusted path policy, and the security confidence information comprises:
means for generating an aggregate trusted path score for each of a plurality of candidate trusted communication paths from the trust confidence score of each of the network elements in each candidate trusted communication path;
means for selecting the trusted communication path according to the aggregate trusted path score and the trusted path policy; and
means for generating the trusted communication path information from the selected trusted communication path.

19. The apparatus of claim 16, wherein the trusted path policy comprises one of:
a best trust policy, specifying that the trusted communication path is the one of a plurality of candidate trusted communication paths having a highest aggregated trusted path score; and
a minimum trust policy, specifying that the trusted communication path is any of the plurality of candidate trusted communication paths having no less than a minimum aggregated trusted path score;
a minimum trusted element trust policy, specifying that the trusted communication path is any of the plurality of candidate trusted communication paths having a trusted network element having no less than a minimum trust confidence score; and
a custom trust policy, specifying that the trusted communication path is any of the plurality of candidate trusted communications paths having in which all of the trusted elements have a desired combination of the security parameters.

20. The apparatus of claim 16, wherein the means for generating a unique trusted path digital certificate for each of the trusted elements, the source, and the destination, and transmitting the generated trusted path digital certificates to each of the trusted elements, the source, and the destination comprises:
means for determining a level of trust of each of the trusted elements from the trust confidence score; and
means for generating the trusted path digital certificate for each trusted network element having the level of trust.

21. A method of transmitting information from a source to a destination in a network of elements including trusted elements via at least one trusted communications path according to a trusted path policy, comprising:
transmitting a trusted path policy query from the source to a resolver, the trusted path policy query comprising the trusted path policy and a destination address;
receiving trusted communication path information generated by the resolver, the trusted communication path information describing at least a portion of the at least one trusted communication path to the destination generated at least in part from security confidence information of each of the trusted elements and the trusted path policy; and
transmitting the information via the trusted communications path according to the trusted communications path information,
wherein the resolver:
receives the security confidence information of each of the trusted elements of the network, the security confidence information having at least one security parameter of the associated trusted element;
registers each of the trusted elements using the security confidence information;
generates a unique trusted communications path digital certificate for each of the source, the destination, and the trusted elements of the network; and
provides each respective unique trusted path digital certificate to the source, the destination and each respective trusted element in the network.

22. The method of claim 21, wherein the security confidence information comprises one or more of:
hardware security confidence information of the trusted element;
software security confidence information of the trusted element; and
vendor information regarding a vendor of the trusted element.

23. The method of claim 21, wherein:
each trusted element of the trusted communication path authenticates the next trusted element of the trusted communications path according to the trusted communication path digital certificate of the next trusted element before transmitting the information to the next trusted element of the trusted communications path.

24. The method of claim 21, wherein:
each trusted element of the trusted communication path authenticates the next trusted element of the trusted communications path according to the trusted communication path digital certificate of the next trusted element before commencing transmission of the information on the trusted communications path.

25. The method of claim 21, wherein:
the trusted communication path information includes an address of only a first trusted element of the trusted communication path;
the resolver further transmits a trusted path routing table having an address to each trusted element in the network; and
each trusted element the trusted communication path determines the next trusted element in the trusted communications path according to the trusted path routing table of the respective trusted element of the trusted communications path.

26. The method of claim 21, wherein:
the trusted communication path information comprises an address to each trusted element in the trusted communication path; and
the trusted communication path information is received from the resolver in the source and transmitted from the source to a first trusted element in the trusted communications path, and thereafter transmitted from each trusted element in the trusted communications path to the next trusted element in the trusted communications path.

27. An apparatus for transmitting information from a source to a destination in a network of elements including trusted elements via at least one trusted communications path according to a trusted path policy, comprising:
a processor;
a memory, communicatively coupled to the processor, the memory storing processor instructions comprising processor instructions for:
transmitting a trusted path policy query from the source to a resolver, the trusted path policy query comprising the trusted path policy and a destination address;
receiving trusted communication path information generated by the resolver, the trusted communication path information describing at least a portion of the at least one trusted communication path to the destination generated at least in part from security confidence information of each of the trusted elements and the trusted path policy; and transmitting the information via the trusted communications path according to the trusted communications path information, wherein the resolver:
receives the security confidence information of each of the trusted elements of the network, the security confidence information having at least one security parameter of the associated trusted element;
registers each of the trusted elements using the security confidence information;
generates a unique trusted path digital certificate for each of the source, the destination, and the trusted elements of the network; and
provides each respective unique trusted path digital certificate to the source, the destination and each respective trusted element in the network.

28. The apparatus of claim 27, wherein the security confidence information comprises one or more of:
hardware security confidence information of the trusted element;
software security confidence information of the trusted element; and
vendor information regarding a vendor of the trusted element.

29. The apparatus of claim 27, wherein:
each trusted element of the trusted communication path authenticates the next trusted element of the trusted communications path according to the trusted communication path digital certificate of the next trusted element before transmitting the information to the next trusted element of the trusted communications path.

30. The apparatus of claim 27, wherein:
each trusted element of the trusted communication path authenticates the next trusted element of the trusted communications path according to the trusted communication path digital certificate of the next trusted element before commencing transmission of the information on the trusted communications path.

31. The apparatus of claim 27, wherein:
the trusted communication path information includes an address of only a first trusted element of the trusted communication path;
the resolver further transmits a trusted path routing table having an address to each trusted element in the network; and
each trusted element the trusted communication path determines the next trusted element in the trusted communications path according to the trusted path routing table of the respective trusted element of the trusted communications path.

32. The apparatus of claim 27, wherein:
the trusted communication path information comprises an address to each trusted element in the trusted communication path; and
the trusted communication path information is received from the resolver in the source and transmitted from the source to a first trusted element in the trusted communications path, and thereafter transmitted from each trusted element in the trusted communications path to the next trusted element in the trusted communications path.

33. An apparatus for transmitting information from a source to a destination in a network of elements including trusted elements via at least one trusted communications path according to a trusted path policy, comprising:
means for transmitting a trusted path policy query from the source to a resolver, the trusted path policy query comprising the trusted path policy and a destination address;
means for receiving trusted communication path information generated by the resolver, the trusted communication path information describing at least a portion of the at least one trusted communication path to the destination generated at least in part from security confidence information of each of the trusted elements and the trusted path policy; and
means for transmitting the information via the trusted communications path according to the trusted communications path information, wherein the resolver:
receives the security confidence information of each of the trusted elements of the network, the security confidence information having at least one security parameter of the associated trusted element;
registers each of the trusted elements using the security confidence information;
generates a unique trusted path digital certificate for each of the source, the destination, and the trusted elements of the network; and
provides each respective unique trusted path digital certificate to the source, the destination and each respective trusted element in the network.

34. The apparatus of claim 33, wherein the security confidence information comprises one or more of:
hardware security confidence information of the trusted element;
software security confidence information of the trusted element; and
vendor information regarding a vendor of the trusted element.

35. The apparatus of claim 33, wherein:
each trusted element of the trusted communication path authenticates the next trusted element of the trusted communications path according to the trusted communication path digital certificate of the next trusted element before transmitting the information to the next trusted element of the trusted communications path.

36. The apparatus of claim 33, wherein:
each trusted element of the trusted communication path authenticates the next trusted element of the trusted communications path according to the trusted communication path digital certificate of the next trusted element before commencing transmission of the information on the trusted communications path.

37. The apparatus of claim 33, wherein:
the trusted communication path information includes an address of only a first trusted element of the trusted communication path;
the resolver further transmits a trusted path routing table having an address to each trusted element in the network; and
each trusted element the trusted communication path determines the next trusted element in the trusted communications path according to the trusted path routing table of the respective trusted element of the trusted communications path.

* * * * *